United States Patent
Khan et al.

(10) Patent No.: US 10,326,522 B1
(45) Date of Patent: Jun. 18, 2019

(54) METHODS AND SYSTEMS FOR WIRELESS COMMUNICATIONS USING AUXILIARY BASE STATIONS

(71) Applicant: Phazr, Inc., Allen, TX (US)

(72) Inventors: Farooq Khan, Allen, TX (US); Sidharth Balasubramanian, Garland, TX (US)

(73) Assignee: Phazr, Inc., Allen, TX (US)

( * ) Notice: Subject to any disclaimer, the term of this patent is extended or adjusted under 35 U.S.C. 154(b) by 0 days.

(21) Appl. No.: 15/916,705

(22) Filed: Mar. 9, 2018

(51) Int. Cl.
   H04B 7/26 (2006.01)
   H04W 72/04 (2009.01)
   H04L 5/14 (2006.01)

(52) U.S. Cl.
   CPC ......... *H04B 7/2675* (2013.01); *H04B 7/2678* (2013.01); *H04W 72/042* (2013.01); *H04W 72/0413* (2013.01); *H04L 5/14* (2013.01)

(58) Field of Classification Search
   CPC .. H04B 7/2675; H04B 7/2678; H04B 7/2045; H04B 7/208; H04B 7/2125; H04B 7/2126; H04B 7/2621; H04B 7/2662; H04W 72/0413; H04W 72/042; H04W 84/12; H04W 88/08; H04W 80/04; H04W 84/18; H04W 88/06; H04W 74/08; H04W 56/00; H04W 56/0045; H04L 5/14; H04L 2012/5608; H04J 2011/0096
   USPC ..... 370/310.2, 328, 338, 349, 350, 279, 281
   See application file for complete search history.

(56) References Cited

U.S. PATENT DOCUMENTS

| | | | | |
|---|---|---|---|---|
| 2002/0028655 A1* | 3/2002 | Rosener | ............... | H04B 7/2606 455/16 |
| 2003/0185287 A1* | 10/2003 | Ogawa | ..................... | H04B 3/36 375/211 |
| 2009/0316609 A1* | 12/2009 | Singh | ................... | H04B 7/2609 370/280 |
| 2010/0159823 A1* | 6/2010 | Smith | .................... | H04B 7/155 455/7 |
| 2015/0207558 A1* | 7/2015 | Braz | .................. | H04B 7/15542 370/315 |

* cited by examiner

*Primary Examiner* — Brenda H Pham
(74) *Attorney, Agent, or Firm* — Michael A. Rahman

(57) ABSTRACT

A method of wireless communication includes receiving a plurality of first downlink signals at a first radio base station, where the plurality of first downlink signals each has a different frequency. The method further includes down-converting the plurality of first downlink signals to a plurality of second downlink signals, where the plurality of second downlink signals have a same frequency. The method also includes transmitting the plurality of second downlink signals to associated user equipments (UEs).

23 Claims, 15 Drawing Sheets

METHODS AND SYSTEMS FOR WIRELESS COMMUNICATIONS USING AUXILIARY BASE STATIONS

BACKGROUND

The invention relates to wireless communications, and in particular relates to methods and systems for wireless communications using auxiliary base stations.

DESCRIPTION OF THE RELATED ART

Currently, wireless access methods are based on two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems, whereas the 4G LTE systems provide wide area long-range connectivity both outdoors and indoors using dedicated infrastructure such as cell towers and backhaul to connect to the Internet.

As more people connect to the Internet, increasingly chat with friends and family, watch and upload videos, listen to streamed music, and indulge in virtual or augmented reality, data traffic continues to grow exponentially. In order to address the continuously growing wireless capacity challenge, the next generation of LAN and WAN systems are relying on higher frequencies referred to as millimeter waves in addition to currently used frequency bands below 7 GHz. The next generation of wireless WAN standard referred to as 5G New Radio (NR) is under development in the Third Generation Partnership Project (3GPP). The 3GPP NR standard supports both sub-7 GHz frequencies as well as millimeter wave bands above 24 GHz. In 3GPP standard, frequency range 1 (FR1) covers frequencies in the 0.4 GHz-6 GHz range. Frequency range 2 (FR2) covers frequencies in the 24.25 GHz-52.6 GHz range. Table 1 provides examples of millimeter wave bands including FR2 bands that may be used for wireless high data-rate communications. In the millimeter wave bands above 24 GHz, a time division duplexing (TDD) scheme is generally preferred. However, regulations in most parts of the World allow using other duplexing schemes including frequency division duplexing (FDD).

TABLE 1

Examples of millimeter wave bands

| Bands [GHz] | Frequency [GHz] | Bandwidth [GHz] |
|---|---|---|
| 26 GHz Band | 24.25-27.5 | 3.250 |
| LMDS Band | 27.5-28.35 | 0.850 |
|  | 29.1-29.25 | 0.150 |
|  | 31-31.3 | 0.300 |
| 32 GHz Band | 31.8-33.4 | 1.600 |
| 39 GHz Band | 38.6-40 | 1.400 |
| 37/42 GHz Bands | 37.0-38.6 | 1.600 |
|  | 42.0-42.5 | 0.500 |
| 47 GHz | 47.2-48.2 | 1.000 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |

TABLE 1-continued

Examples of millimeter wave bands

| Bands [GHz] | Frequency [GHz] | Bandwidth [GHz] |
|---|---|---|
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

Table 2 lists examples of FR1 bands in the 3GPP standard. We refer to the FR1 bands in the 3GPP standard, unlicensed 2.4 GHz and 5 GHz bands, 5.925-6.425 GHz and 6.425-7.125 GHz bands and any other spectrum band below 7 GHz as sub-7 GHz spectrum. The duplexing schemes used in the sub-7 GHz spectrum, among others, can be time division duplexing (TDD), frequency division duplexing (FDD), supplemental downlink (SDL) or supplemental uplink (SUL).

TABLE 2

Examples of FR1 bands in 3GPP

| 5G-RAN Frequency Band | Uplink Frequency band | Downlink Frequency band | Duplex Mode |
|---|---|---|---|
| n1 | 1920 MHz-1980 MHz | 2110 MHz-2170 MHz | FDD |
| n3 | 1710 MHz-1785 MHz | 1805 MHz-1880 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n41 | 2496 MHz-2690 MHz | 2496 MHz-2690 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n77 | 3300 MHz-4200 MHz | N/A | TDD |
| n78 | 3300 MHz-3800 MHz | N/A | TDD |
| n79 | 4400 MHz-5000 MHz | N/A | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

In addition to serving mobile devices, the next generation of wireless WAN systems using millimeter wave and sub-7 GHz spectrum is expected to provide high-speed (Gigabits per second) links to fixed wireless broadband routers installed in homes and commercial buildings.

SUMMARY

Various aspects of the present disclosure are directed to wireless communications using auxiliary base stations. In one aspect of the present disclosure, a method of wireless communication includes receiving a plurality of first downlink signals at a first radio base station, where the plurality of first downlink signals each has a different frequency. The method further includes down-converting the plurality of first downlink signals to a plurality of second downlink signals, where the plurality of second downlink signals have a same frequency. The method also includes transmitting the plurality of second downlink signals to associated user equipments (UEs).

In an additional aspect of the disclosure, a method of wireless communication includes receiving a plurality of first uplink signals at a first radio base station, where the plurality of first uplink signals have a same frequency. The method further includes up-converting the plurality of first uplink signals to a plurality of second uplink signals, where the plurality of second uplink signals each has a different frequency. The method also includes transmitting the plurality of second uplink signals to a second base station.

In an additional aspect of the disclosure, a radio base station includes means for receiving a plurality of first downlink signals, where the plurality of first downlink signals each has a different frequency. The radio base station also includes means for down-converting the plurality of first downlink signals to a plurality of second downlink signals, wherein the plurality of second downlink signals have a same frequency. The radio base station also includes means for transmitting the plurality of second downlink signals to associated user equipments (UEs).

In an additional aspect of the disclosure, a radio base station includes means for receiving a plurality of first uplink signals at a first radio base station, where the plurality of first uplink signals have a same frequency. The radio base station also includes means for up-converting the plurality of first uplink signals to a plurality of second uplink signals, where the plurality of second uplink signals each has a different frequency. The radio base station also includes means for transmitting the plurality of second uplink signals to a second base station.

In an additional aspect of the disclosure, a method of wireless communication includes receiving at a user equipment (UE) first downlink signals, where the first downlink signals are transmitted by a first radio base station, and where the first downlink signals are generated by the first radio base station by down-converting second downlink signals. The method also includes transmitting by the UE first uplink signals to the first radio base station, where the first uplink signals are up-converted by the first radio base station to second uplink signals.

In an additional aspect of the disclosure, a method of wireless communication includes receiving at a user equipment (UE) first downlink signals, where the first downlink signals are transmitted by a first radio base station, and where the first downlink signals are generated by the first radio base station by down-converting second downlink signals transmitted by a second radio base station. The method also includes transmitting by the UE first uplink signals to the second radio base station.

In an additional aspect of the disclosure, a method of wireless communication includes receiving at a user equipment (UE) first downlink signals, where the first downlink signals are transmitted by a first radio base station, and where the first downlink signals are generated by the first radio base station by down-converting second downlink signals transmitted by a second radio base station. The method includes transmitting by the UE first uplink signals to the second radio base station.

DETAILED DESCRIPTION

The techniques described herein may be used for various wireless communication networks such as CDMA, TDMA, FDMA, OFDMA, SC-FDMA, Fifth Generation (5G) and other networks. The terms "network" and "system" are often used interchangeably. The techniques described herein may be used in wireless networks and radio access networks (RAN) such as fixed wireless access (FWA) networks and various types of mobile networks.

Figure 1:
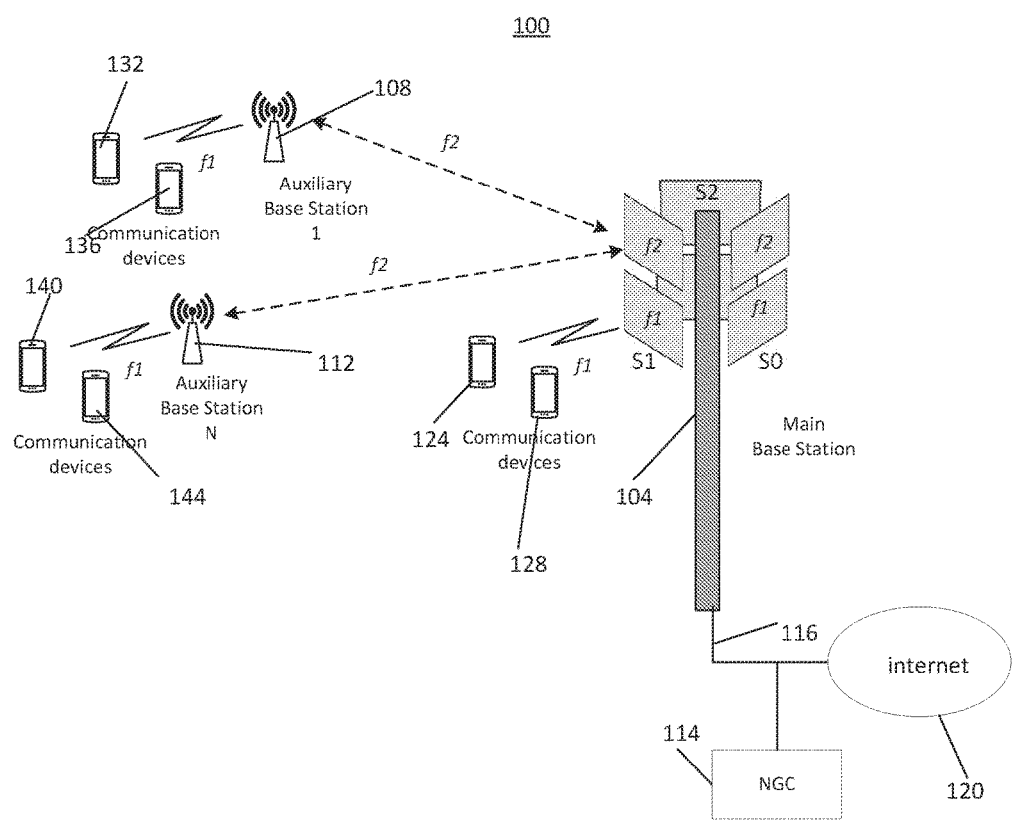
FIGS. 1-2 illustrate wireless systems in accordance with disclosed embodiments.

FIG. 1 illustrates a wireless system 100 in accordance with disclosed embodiments. The wireless system 100 consists of at least one main base station 104 and one or more auxiliary base stations 108 and 112. The main base station communicates with the auxiliary base stations 108 and 112 on a frequency f2. The main and auxiliary base stations communicate with communication devices on frequency f1. The main and auxiliary base stations may implement sectorization. In the example of FIG. 1, the main base station implements three sectors, S0, S1 and S2.

Referring to FIG. 1, the main base station may be connected to a network 114 (e.g., Next Generation Core (NGC) network) using a communication link 116 (e.g., high-speed Fiber backhaul link). The network 114 may be connected to the Internet 120. The main base station 104 serves communication devices 124 and 128, the auxiliary radio base station 108 serves communication devices 132 and 136, and the auxiliary radio base station 112 serves communication devices 140 and 144. The communication devices 124, 128, 132, 136, 140 and 140 may, for example, be smartphones, laptop computers, desktop computers, augmented reality/virtual reality (AR/VR) devices or any other communication devices.

Figure 2:
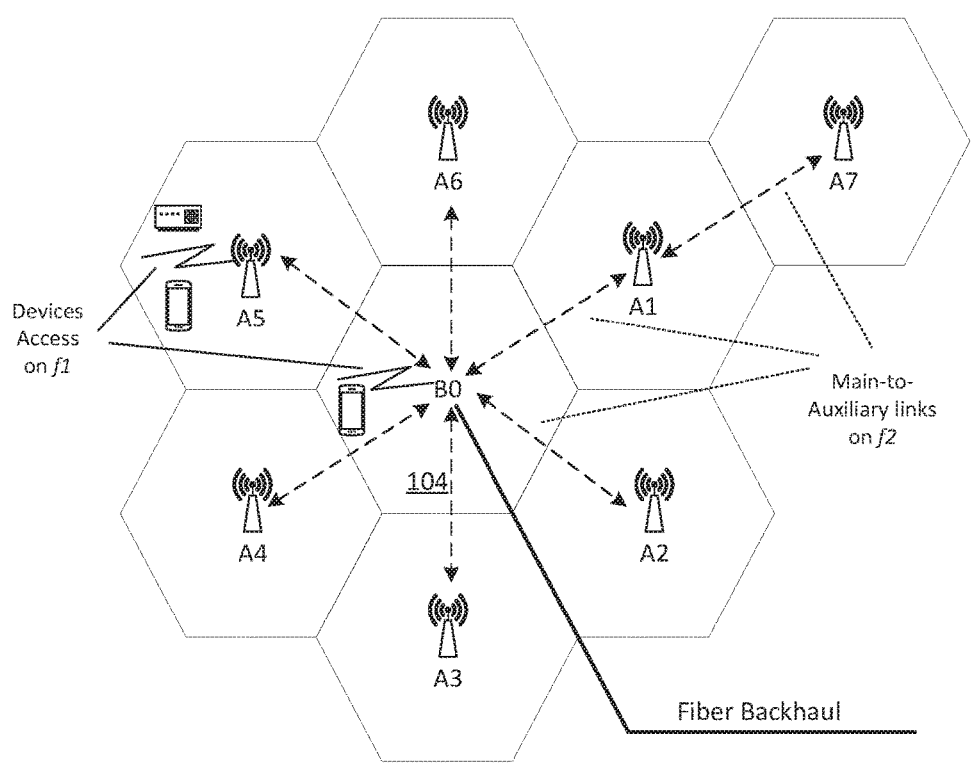

FIG. 2 illustrates a wireless system wherein the main radio base station 104 communicates with seven auxiliary base stations, A1-A7.

Figure 3A:
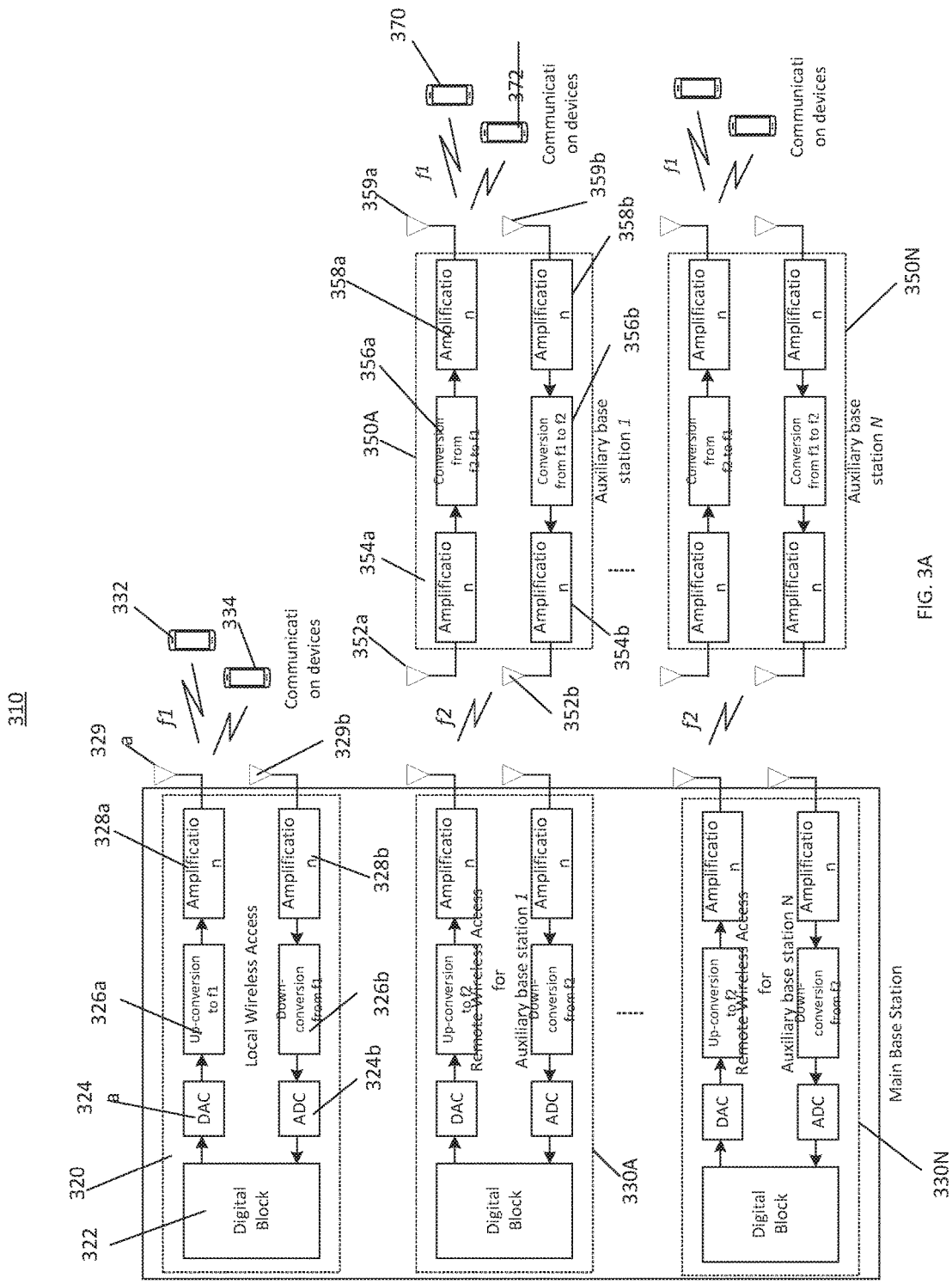
FIGS. 3A-3C are block diagrams of base stations in accordance with disclosed embodiments.

FIG. 3A shows a functional block diagram of a design of a main radio base station 310 and auxiliary radio base stations 350A-350N in accordance with disclosed embodiments. The main radio base station 310 includes a transceiver 320 for a local wireless access where communication devices 332 and 334 directly communicate with the main radio base station 310 on frequency band f1. The main radio base station 310 also includes one or more transceivers 330A-330N for communication with one or more auxiliary radio base stations 350A-350N on frequency band f2. The frequency bands f1 and f2 can be in the millimeter wave spectrum such as 26, 28, 37, 39, 60, 70, 80 GHz bands or in the sub-7 GHz spectrum such as 3.5-4.2 GHz licensed or 5 GHz unlicensed bands.

At the transceiver 320, a digital module 322 may perform baseband processing, digital signal processing (DSP), communications protocol processing, memory and networking functions. The digital module 322 may generate data which is converted to analog signals by a digital-to-analog converter (DAC) 324a. The analog signals may be up-converted to frequency f1 by an up-conversion module 326a and amplified by a power amplifier (PA) 328a. The transceiver 330 may be equipped with a transmit antenna 329a for transmission of the signals (as downlink signals) to the communication devices 332 and 334.

On the uplink at the transceiver 320, a receive antenna 329b may receive uplink signals from the communication devices 332 and 334 which are amplified by a low noise amplifier (LNA) 328b. A down-conversion module 326b may perform down-conversion and an analog-to-digital converter (DAC) 324b may digitize the signals to data. The digital module 322 may receive the data for baseband processing and digital signal processing (DSP).

Referring to FIG. 3A, the auxiliary base stations 350A-350N include frequency-conversion and amplification modules. The auxiliary radio base station 350A may be equipped with a first receive antenna 352a which receives first millimeter wave downlink signals at frequency f2 from the main radio base station 310. An amplifier 354a amplifies the first millimeter wave downlink signals and a down-conversion module 356a down-converts the signals from frequency f2 to frequency f1. The down-converted signals are amplified by an amplifier 358a and transmitted by a first transmit antenna 359a as second downlink signals at frequency f1 to communication devices 370 and 372.

On the uplink, at the auxiliary base station 350A, a second receive antenna 359b may receive uplink signals from the communication devices 370 and 372 which are amplified by an amplifier 358b. A up-conversion module 356b may up-convert the signals from frequency f1 to frequency f2, and an amplifier 354b may amplify the signals prior to transmission by a second transmit antenna 352b at frequency f2.

Referring to FIG. 3A, the main base station 310 performs baseband processing, digital signal processing, communications protocol processing, DAC/ADC, up-conversion/down-conversion and amplification functionalities. In contrast, the auxiliary base stations 350A-350N perform amplification and frequency conversion functionalities.

Figure 3B:
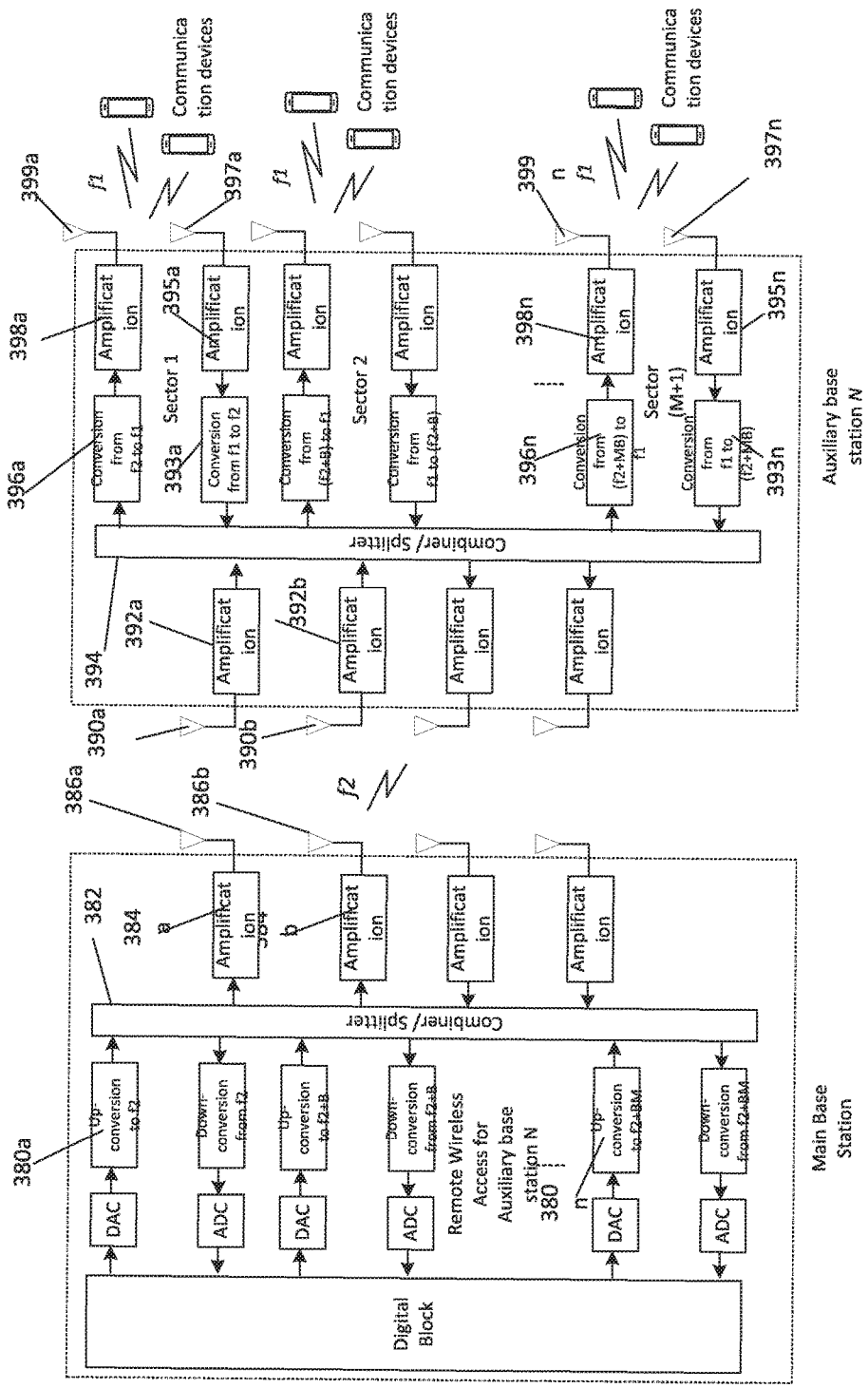

FIG. 3B illustrates a functional block diagram of a main radio base station 376 and an auxiliary radio base station 378 supporting (M+1) sectors in accordance with some disclosed embodiments. Using a set of up-conversion modules 380a-380n, the main radio base station 376 up-converts signals for sector 1 to f2, for sector 2 to f2+B and for sector M to (f2+BM) where B is the bandwidth of the signals. In other embodiments, the bandwidth B can be different for different sectors. The up-converted signals may be combined at a combiner/splitter module 382, amplified by an amplifier 384a and transmitted from a pair of cross-polarized antennas 386a (e.g., a vertically polarized and a horizontally polarized antenna).

At the auxiliary radio base station 378, a pair of cross-polarized antennas 390a, such as a vertically polarized and a horizontally polarized antenna, may receive the signals from the main base station 376. The received signals are amplified by an amplifier 392a, and split by a splitter 394 into a plurality of signal streams. A set of down-conversion modules 396a-396n down-converts respective signal streams. The down-conversion modules may convert frequency f2 to f1 for sector 1, (f2+B) to f1 for sector 2 and from (f2+BM) to f1 for sector M where B is the bandwidth of the signals received. The down-converted signals are amplified by a set of amplifiers 398a-398n and transmitted by antennas 399a-399n to the communication devices.

On the uplink, the auxiliary radio base station up-converts signals received from the communication devices in sector 1 to f2, signals received from communication devices in sector 2 to f2+B and signals received from devices in sector M to (f2+BM) where B is the bandwidth of the signals transmitted. The up-converted signals for a given sector of the auxiliary radio base station may be transmitted from a pair of cross-polarized antennas such as a vertically polarized and a horizontally polarized antenna. The main radio base station receives signals from the auxiliary radio base station and down-convert signals at frequency f2, (f2+B) and (f2+BM) to baseband.

Figure 3C:
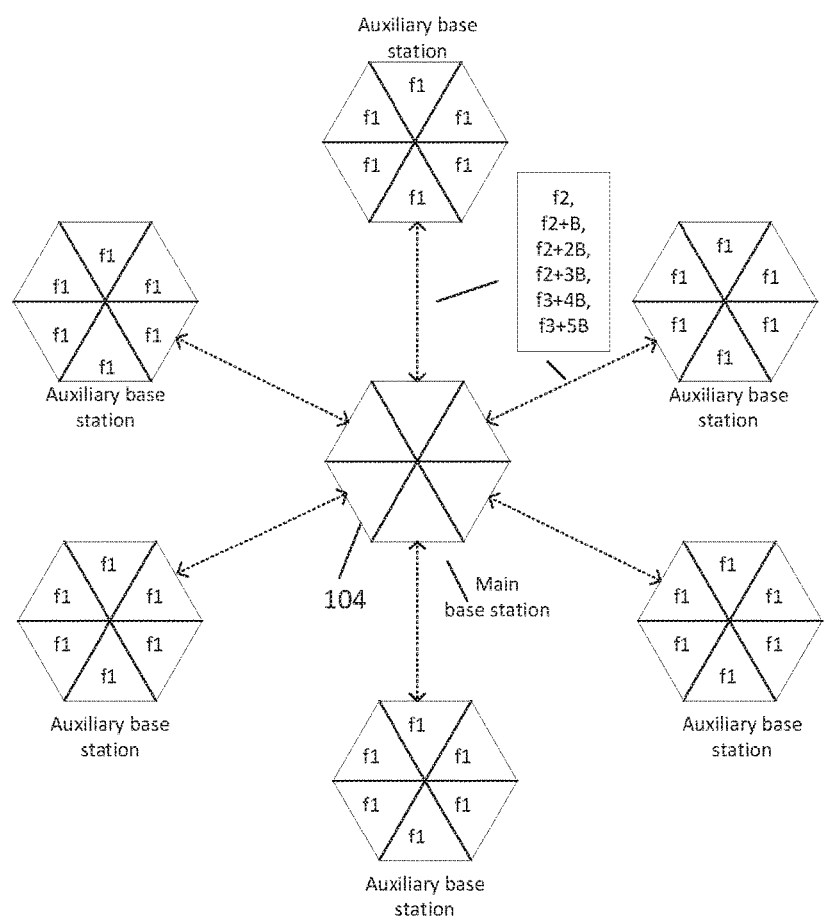

FIG. 3C illustrates a a main radio base station 104 serving six auxiliary radio base station each supporting 6 sectors in accordance with some disclosed embodiments. The main radio base station up-converts signals for sector 1 of each auxiliary radio base station to f2, f2+B for sector 2, f2+2B for sector 3, f2+3B for sector 4, f2+4B for sector 5 and f2+5B for sector 6, where B is the bandwidth of the signals. In other embodiments, the bandwidth B can be different for different sectors. The up-converted signals may be combined at a combiner/splitter module, amplified by an amplifier and transmitted from a pair of cross-polarized antennas (e.g., a vertically polarized and a horizontally polarized antenna).

At the auxiliary radio base station, a pair of cross-polarized antennas, such as a vertically polarized and a horizontally polarized antenna, may receive the signals from the main base station. The received signals are amplified by an amplifier and split by a splitter into a plurality of signal streams. A set of down-conversion modules down-converts respective signal streams. The down-conversion modules may convert frequency f2 to f1 for sector 1, (f2+B) to f1 for sector 2, (f2+2B) to f1 for sector 3, (f2+3B) to f1 for sector 4, (f2+4B) to f1 for sector 5 and (f2+5B) to f1 for sector 5 where B is the bandwidth of the signals received. The down-converted signals are amplified by a set of amplifiers and transmitted to the communication devices.

On the uplink, the auxiliary radio base station up-converts signals received from the communication devices in sector 1 to f2, signals received from communication devices in sector 2 to f2+B, signals received from communication devices in sector 3 to f2+2B, signals received from communication devices in sector 4 to f2+3B, signals received from communication devices in sector 5 to f2+4B and signals received from communication devices in sector 6 to f2+5B. The up-converted signals for a given sector of the auxiliary radio base station may be transmitted from a pair of cross-polarized antennas such as a vertically polarized and a horizontally polarized antenna. The main radio base station receives signals from the auxiliary radio base station and down-convert signals at frequency f2, (f2+B), (f2+2B), (f2+3B), (f2+4B) and (f2+5B) to baseband.

Since a main base station may communicate with a plurality of auxiliary base stations in different directions, the same frequency and same bands within that frequency such as f2, (f2+B), (f2+2B), (f2+3B), (f2+4B) and (f2+5B) may be used for communication between the main base station and the auxiliary base stations. An auxiliary base stations serves many communication devices spread out in different directions by using sectors, multiple antennas MIMO or a combination thereof using the same frequency f1 in its coverage area. This means the wireless link between the main base station and the auxiliary base station needs to carry signals for many different sectors or antenna chains. The use of a higher millimeter wave frequency f2 allows carrying these signals for many different sectors or antenna chains of an auxiliary base station by packing these signals in different frequency bands such as f2, (f2+B), (f2+2B), (f2+3B), (f2+4B), (f2+5B) and so on.

Figure 4:
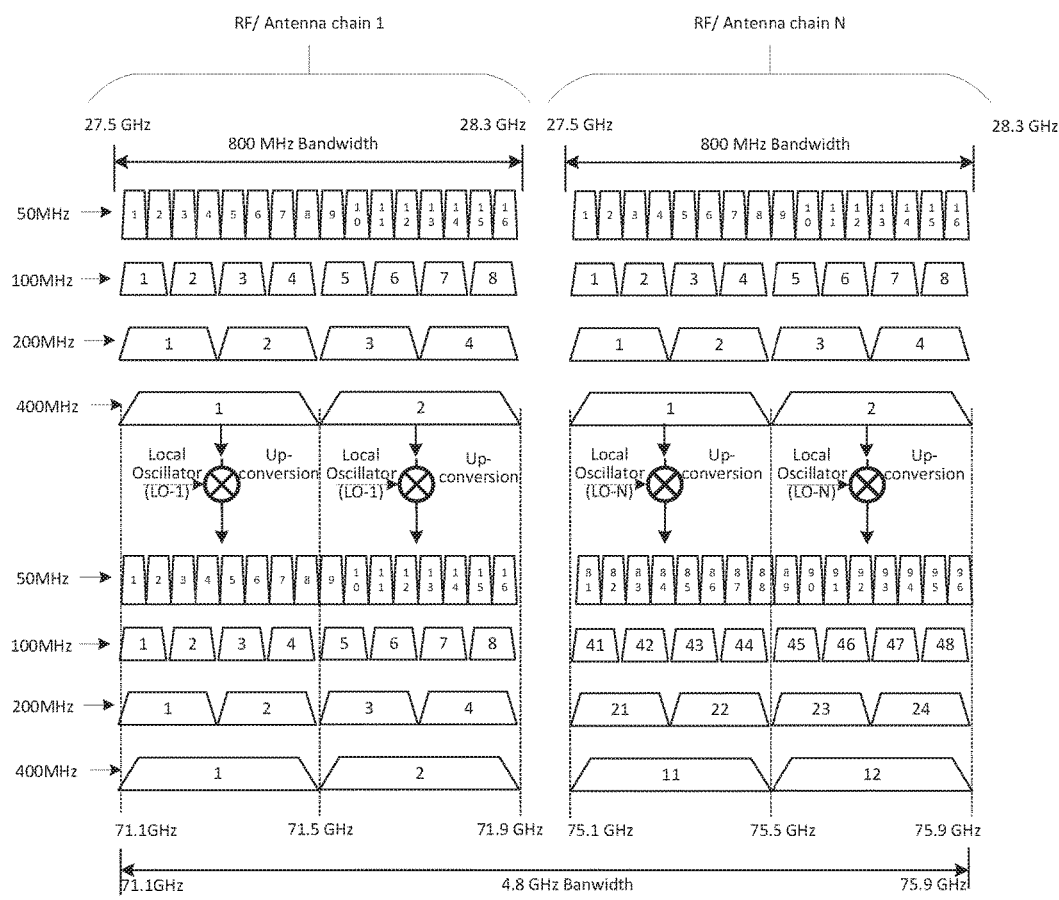
FIGS. 4-5 show frequency conversions in accordance with disclosed embodiments.

FIG. 4 illustrates frequency up-conversion in accordance with the embodiments of the current invention. Referring to FIG. 4, the main radio base station communicates with the communication devices on the millimeter wave frequency f1 of 28 GHz. The main radio base station up-converts baseband signals or signals at millimeter wave frequency f1 of 28 GHz to the millimeter wave frequency f2 of 70 GHz and transmits the signals to the auxiliary base station. The auxiliary radio base station up-converts signals received from the communication devices at 28 GHz millimeter wave frequency f1 to the millimeter wave frequency f2 of 70 GHz and transmits the signals to the main base station. When communication between the radio base stations and the communication devices uses MIMO (Multiple Input Multiple Output) or beamforming antenna techniques, the 28 GHz millimeter wave frequency f1 signals for different RF/antenna chains may be up-converted to different parts in the millimeter wave frequency band f2 of 70 GHz.

Referring to FIG. 4, a total 800 MHz bandwidth (B) is used at the 28 GHz millimeter wave frequency f1 while a total of 4.8 GHz bandwidth is available at frequency f2 of 70 GHz. We can fit 6 channels of 800 MHz bandwidth each in the 4.8 GHz bandwidth at frequency f2 of 70 GHz. This means that we can carry 800 MHz bandwidth for 6 RF/antenna chains or sectors or a combination thereof in the 4.8 GHz bandwidth at frequency f2 of 70 GHz. As discussed previously, main base station and auxiliary base stations can also implement a pair of cross-polarized antennas such as a vertically polarized and a horizontally polarized antenna. In case of cross-polarized antennas, the frequency channel used at 70 GHz for the vertically polarized and horizontally polarized antennas can be the same. The up-conversion to 70 GHz allows carrying signals at the full bandwidth of 800 MHz for many antennas and sectors of the auxiliary base station.

Figure 5:
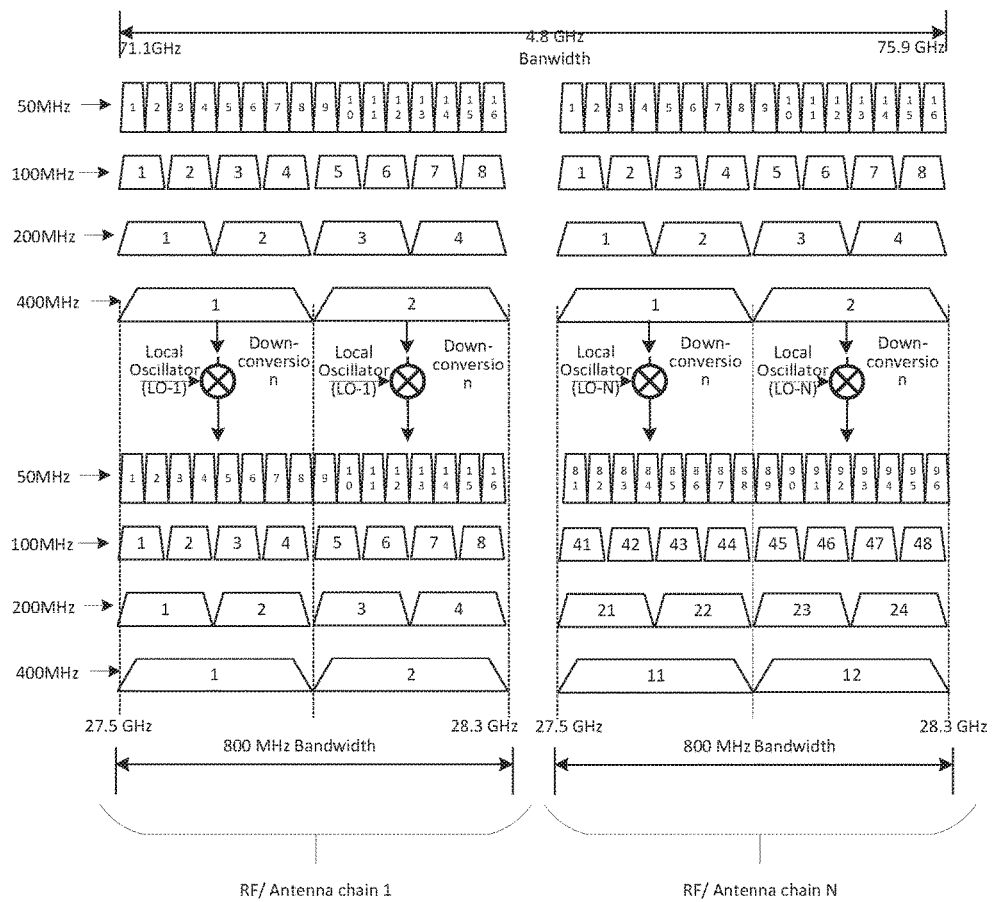

FIG. 5 illustrates frequency down-conversion in accordance with the embodiments of the current invention. Referring to FIG. 5, the auxiliary radio base station down-converts signals received from the main radio base station at the millimeter wave frequency f2 of 70 GHz to the 28 GHz millimeter wave frequency f1 signals and transmits the signals to the communication devices. The main radio base station down-converts signals received from the auxiliary radio base station at the millimeter wave frequency f2 of 70 GHz to the 28 GHz millimeter wave frequency f1 signals. When communication between the radio base stations and the communication devices uses MIMO (Multiple Input Multiple Output) or beamforming antenna techniques, the 28 GHz millimeter wave frequency f1 signals for different RF/antenna chains are down-converted from different parts in the millimeter wave frequency f2 of 70 GHz. In the main radio base station, the down-converted 28 GHz millimeter wave frequency f1 signals for different RF/antenna chains are further down-converted to baseband signals for MIMO and beamforming processing. In the auxiliary radio base station, the down-converted 28 GHz millimeter wave frequency f1 signals for different RF/antenna chains are transmitted to the communication devices from different RF/antenna chains in the auxiliary base station. The communication devices receive the 28 GHz millimeter wave frequency f1 signals transmitted from different RF/antenna from the auxiliary radio base station and further down-converts the signals to baseband signals for MIMO and beamforming processing.

Referring to FIG. 5, a total 800 MHz bandwidth is used at the 28 GHz millimeter wave frequency f1 while a total of 4.8 GHz bandwidth is available at frequency f2 of 70 GHz. We can fit 6 channels of 800 MHz bandwidth each in the 4.8 GHz bandwidth at frequency f2 of 70 GHz. This means that we can carry 800 MHz bandwidth for 6 RF/antenna chains in the 4.8 GHz bandwidth at frequency f2 of 70 GHz. In case of cross-polarized antennas, the frequency channel used at 70 GHz for the vertically polarized and horizontally polarized antennas can be the same. The up-conversion to 70 GHz allows carrying signals at the full bandwidth of 800 MHz for many antennas and sectors of the auxiliary base station.

Figure 6:
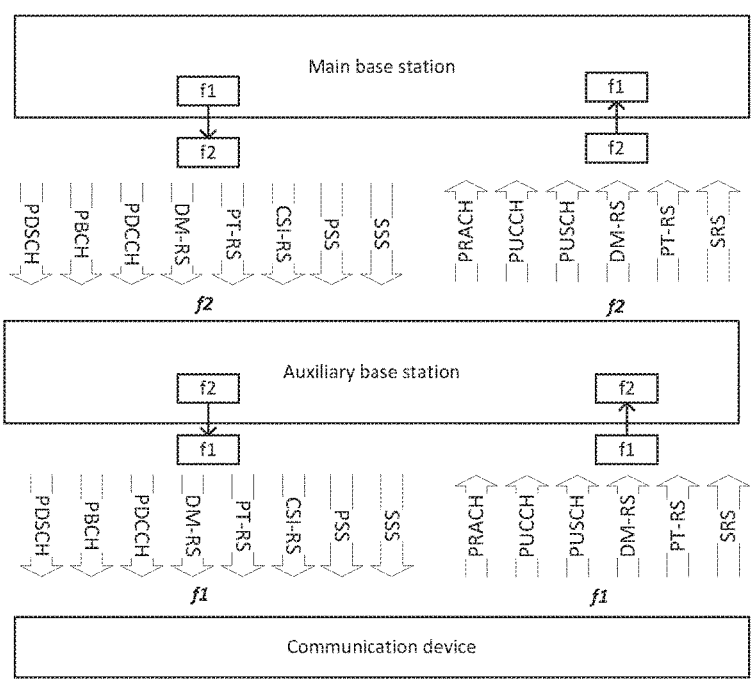
FIG. 6 illustrates physical channels and physical signals in accordance with disclosed embodiments.

FIG. 6 illustrates uplink physical channels and uplink physical signals transmission and reception, and downlink physical channels and downlink physical signals transmission and reception in accordance with some disclosed embodiments. In the example of FIG. 6, a main radio base station communicates with a communication device via an auxiliary base station. An uplink physical channel corresponds to a set of resource elements carrying information originating from higher layers. The uplink physical channels transmitted from a communication device and received by a main radio base station 708 include: Physical Uplink Shared Channel (PUSCH), Physical Uplink Control Channel (PUCCH), Physical Random Access Channel (PRACH). An uplink physical signal is used by the physical layer but does not carry information originating from higher layers. The uplink physical signals transmitted from the communication device and received by the main radio base station 708 include: Demodulation reference signals (DM-RS), Phase-tracking reference signals (PT-RS) and Sounding reference signal (SRS).

A downlink physical channel corresponds to a set of resource elements carrying information originating from higher layers. The downlink physical channels transmitted from the main radio base station and received by the communication device include: Physical Downlink Shared Channel (PDSCH), Physical Broadcast Channel (PBCH) and Physical Downlink Control Channel (PDCCH). A downlink physical signal corresponds to a set of resource elements used by the physical layer but does not carry information originating from higher layers. The downlink physical signals transmitted from the radio base station and received by the communication device include: Demodulation reference signals (DM-RS), Phase-tracking reference signals (PT-RS) Channel-state information reference signal (CSI-RS) Primary synchronization signal (PSS) and Secondary synchronization signal (SSS).

Referring to FIG. 6, the main radio base station takes the downlink physical channels and downlink physical signals meant for transmission to the communication devices at frequency f1 and converts frequency to a second frequency f2 and transmits the downlink physical channels and downlink physical signals to the auxiliary base station at this second frequency f2. The auxiliary radio base station receives the downlink physical channels and downlink physical signals at frequency f2 and converts frequency to f1 and transmits the downlink physical channels and downlink physical signals to the communication device at frequency f1.

Referring to FIG. 6, the auxiliary radio base station receives the uplink physical channels and uplink physical signals from the communication device at frequency f1 and converts frequency to f2 and transmits the uplink physical channels and uplink physical signals to the main radio base station at frequency f2. The main radio base station receives the uplink physical channels and uplink physical signals from the auxiliary radio base station at frequency f2, converts frequency to f1 for further processing of the uplink physical channels and uplink physical signals. In other embodiments, main radio base station can convert the frequency f2 to another intermediate frequency or convert the received channels and signals at frequency f2 directly to base band for further processing.

Figure 7A:
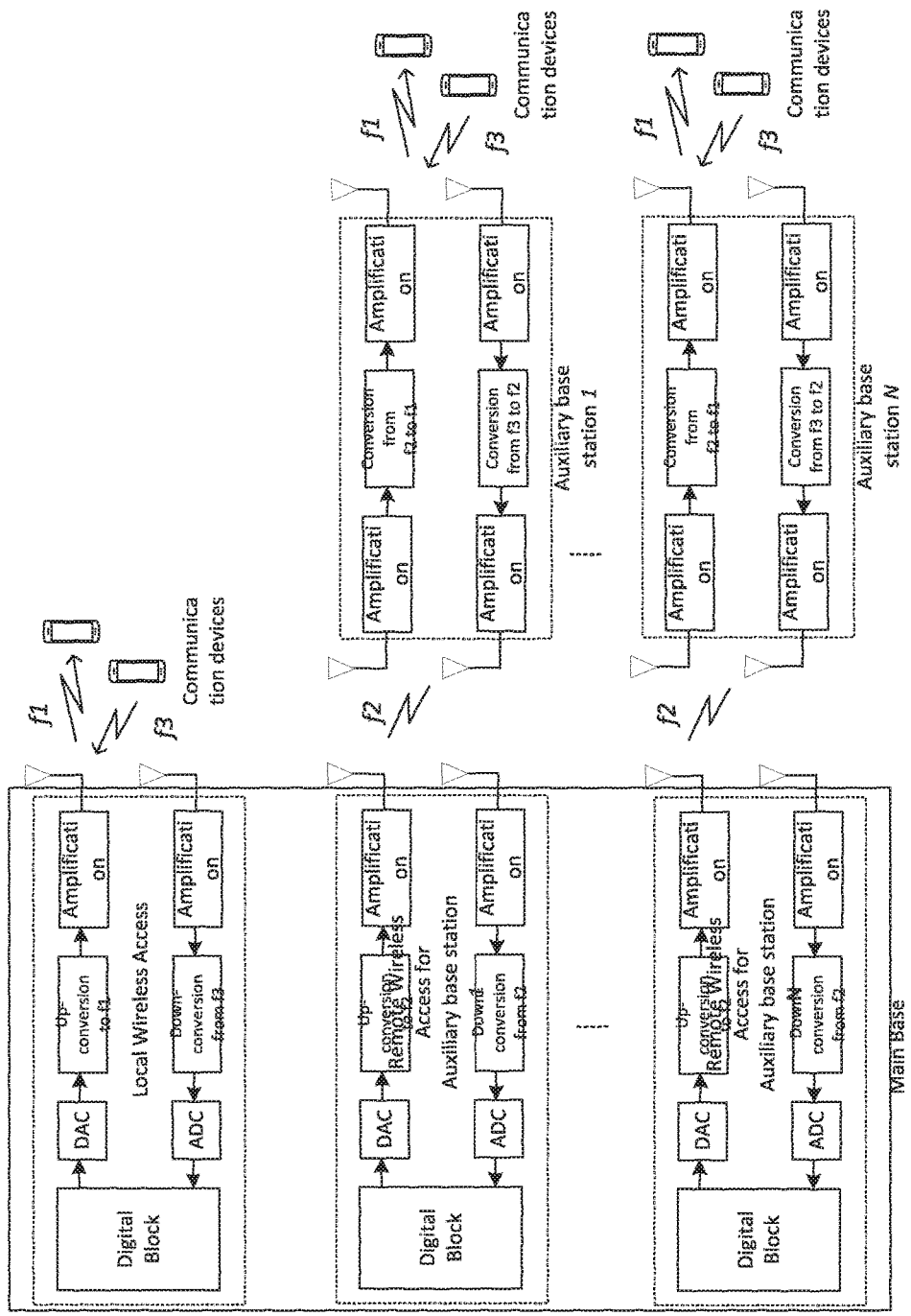
FIG. 7A illustrates a system in accordance with disclosed embodiments.
Figure 7B:
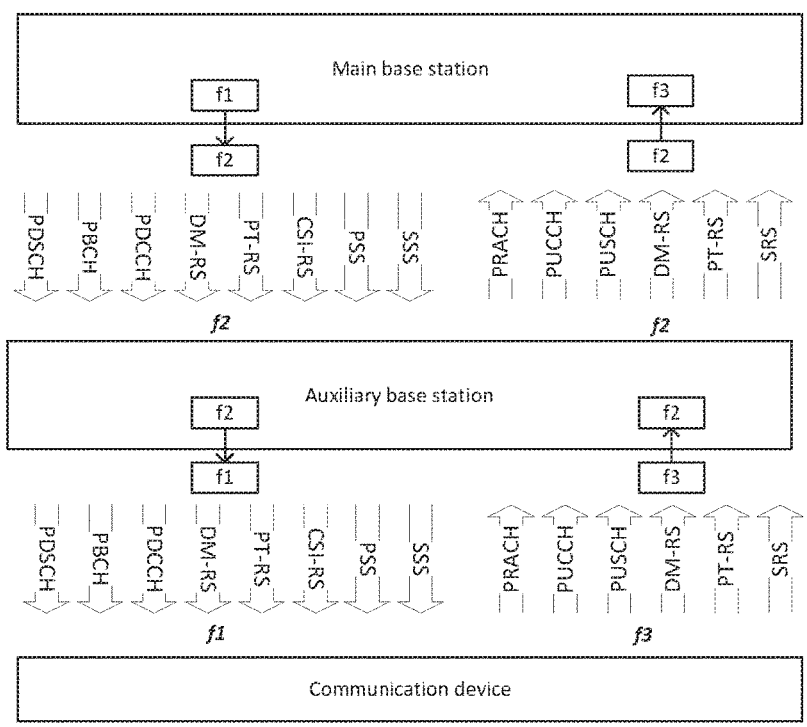
FIG. 7B illustrates physical channels and physical signals in accordance with disclosed embodiments.

FIGS. 7A-7B illustrate uplink physical channels and uplink physical signals transmission and reception, and downlink physical channels and downlink physical signals transmission and reception in accordance with other disclosed embodiments. In the examples of FIG. 7A-7B, the communication devices receive downlink physical channels and downlink physical signals on frequency f1 in the millimeter wave spectrum such as 26, 28, 37 and 39 GHz bands while transmit the uplink physical channels and uplink physical signals on frequency f3 in the sub-7 GHz spectrum such as 3.5-4.2 GHz licensed or 5 GHz unlicensed bands.

Referring to FIGS. 7A-7B, the auxiliary radio base station receives the uplink physical channels and uplink physical signals from the communication device at frequency f3 and converts frequency to f2 and transmits the uplink physical channels and uplink physical signals to the main radio base station at frequency f2. The frequency f2 can be in the millimeter wave spectrum such as 26, 28, 37, 39, 60, 70 or 80 GHz bands. The main radio base station receives the uplink physical channels and uplink physical signals from the auxiliary radio base station at frequency f2, converts frequency to f3 in the sub-7 GHz spectrum such as 3.5-4.2 GHz licensed or 5 GHz unlicensed bands for further processing of the uplink physical channels and uplink physical signals. In other embodiments, main radio base station can convert the frequency f2 to another intermediate frequency or convert the received channels and signals at frequency f2 directly to base band for further processing.

Figure 8A:
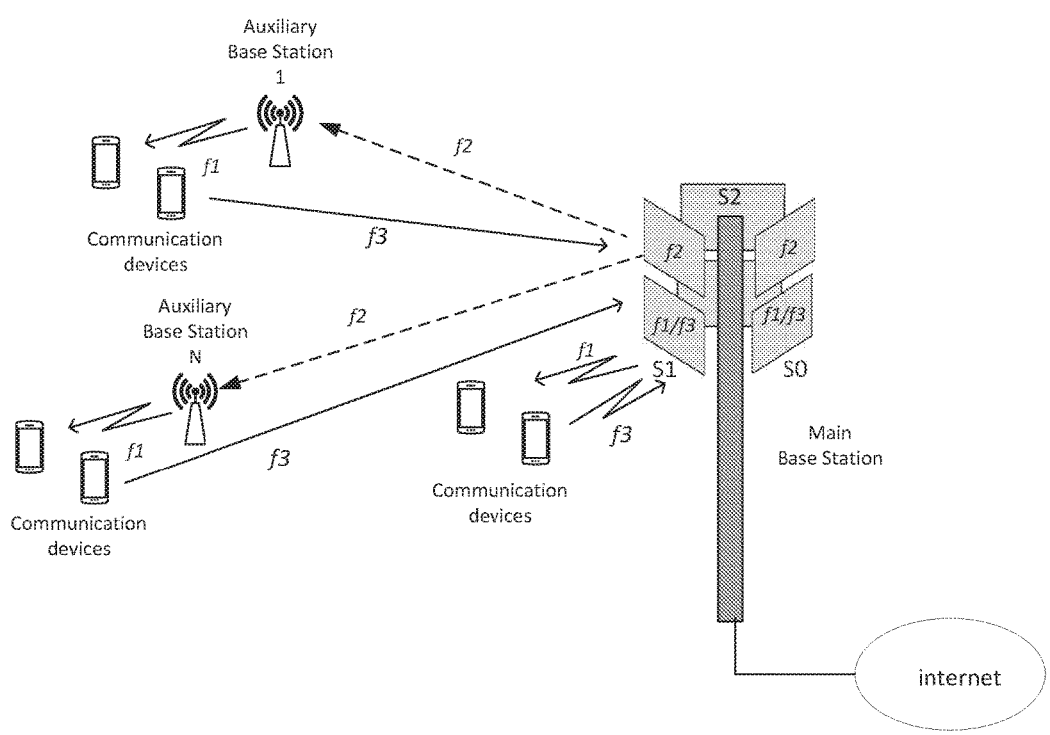
FIG. 8A-8C show communication between a main base station and communication devices.
Figure 8B:
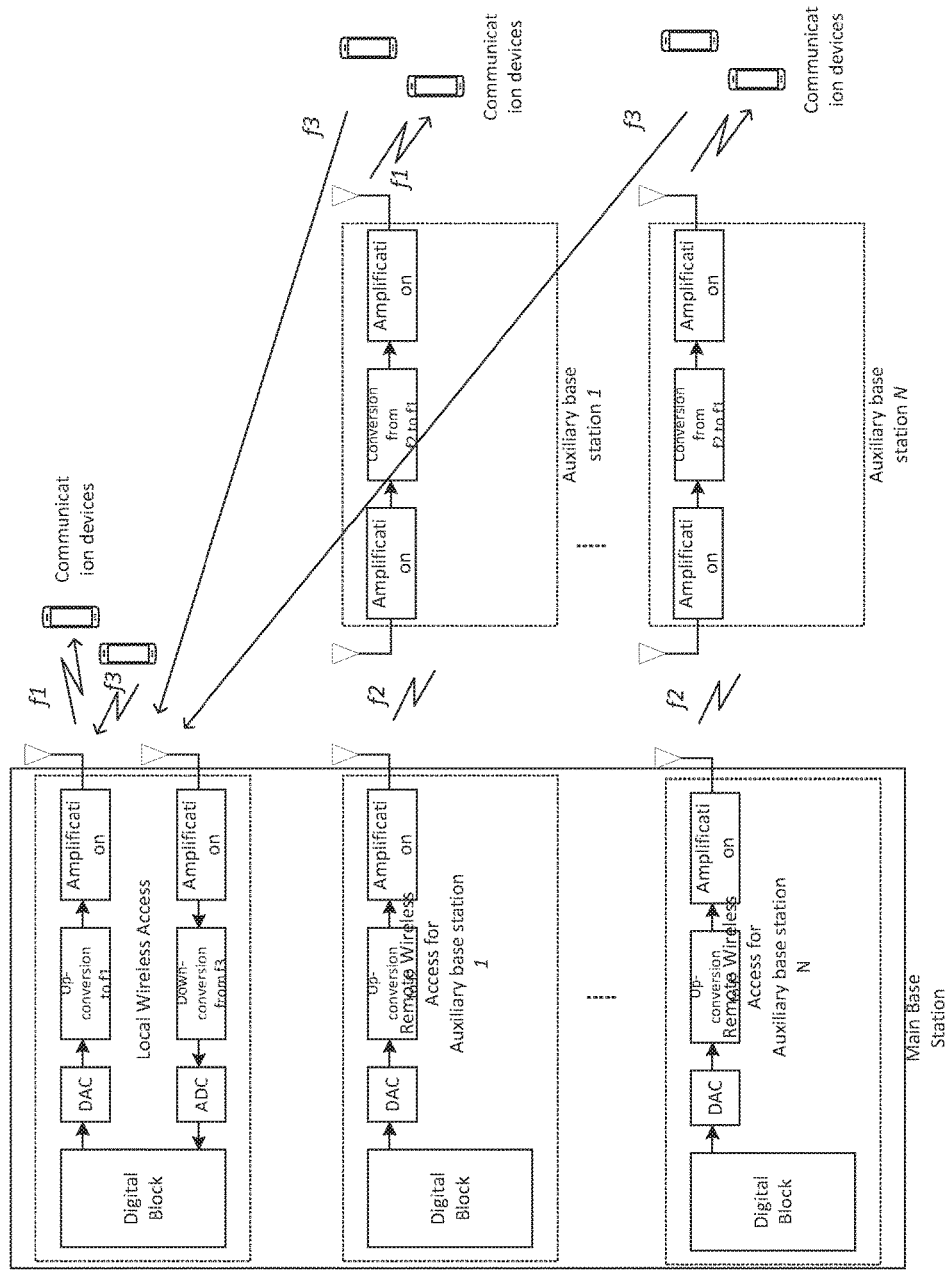
Figure 8C:
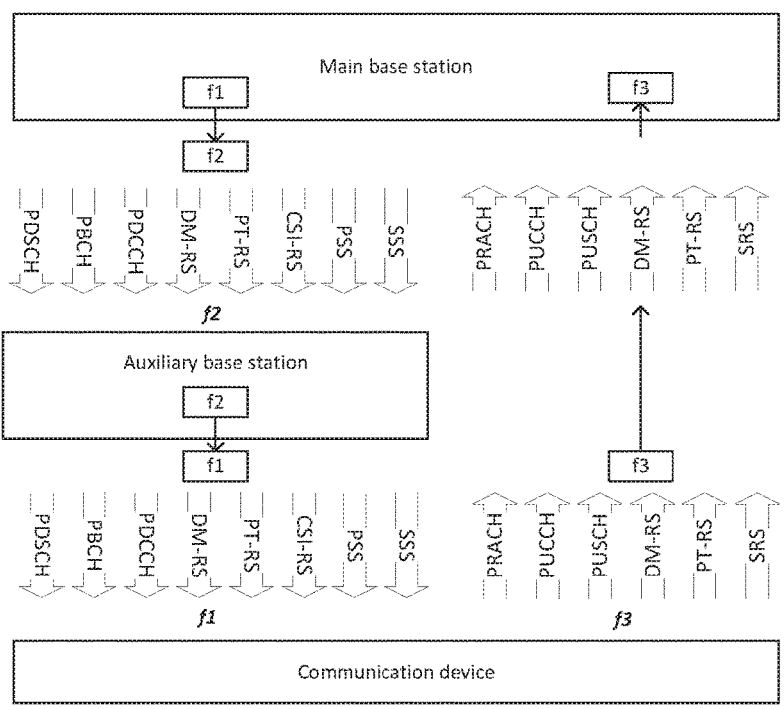

FIG. 8A-8C show embodiments wherein the downlink transmissions between the main base station and communication devices are carried via the auxiliary base stations while the uplink transmissions are carried directly between the communication devices and the main base station.

Referring to FIGS. 8A and 8B, the main radio base station takes the downlink physical channels and downlink physical signals meant for transmission to the communication devices at frequency f1 and converts frequency to a second frequency f2 and transmits the downlink physical channels and downlink physical signals to the auxiliary base station at this second frequency f2. The auxiliary radio base station receives the downlink physical channels and downlink physical signals at frequency f2 and converts frequency to f1 and transmits the downlink physical channels and downlink physical signals to the communication device at frequency f1.

FIG. 8C illustrates uplink physical channels and uplink physical signals transmission and reception, and downlink physical channels and downlink physical signals transmission and reception in accordance with some disclosed embodiments. In the example of FIG. 8C, the communication devices receive downlink physical channels and downlink physical signals on frequency f1 in the millimeter wave spectrum such as 26, 28, 37 and 39 GHz bands from the auxiliary base station while transmit the uplink physical channels and uplink physical signals on frequency f3 in the sub-7 GHz spectrum such as 3.5-4.2 GHz licensed or 5 GHz unlicensed bands directly to the main base station.

Figure 9A:
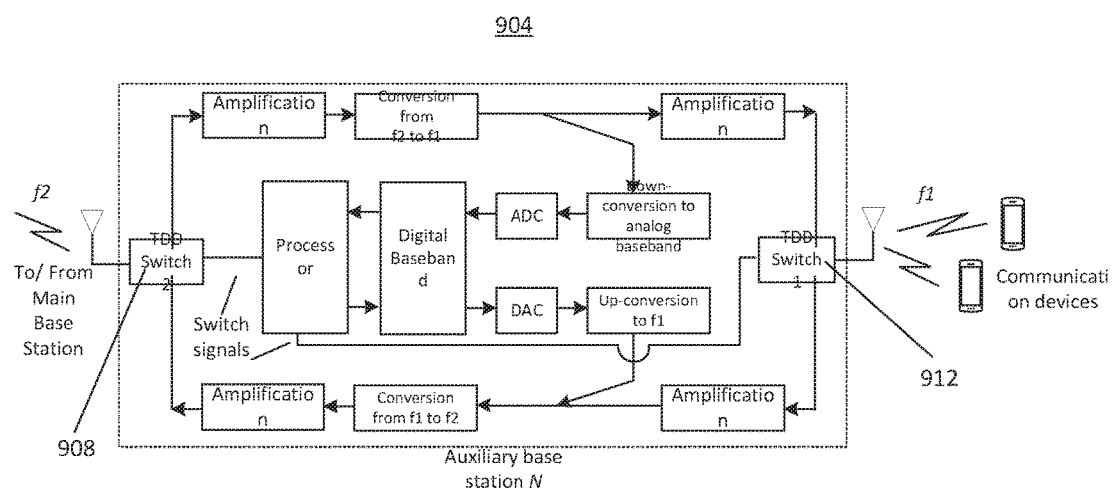
FIGS. 9A-9B show Time Division Duplex (TDD) timing synchronization.

FIG. 9A illustrates Time Division Duplex (TDD) timing synchronization of an auxiliary radio base station 904 with the TDD timing of the main radio base station (not shown in FIG. 9A). The auxiliary radio base station 904 converts the signals received from the main radio base station at frequency f2 to frequency f1 and transmits these signals to the communication devices. The auxiliary radio base station 904 also taps into the received signals and converts them to baseband signals for detecting and decoding the downlink physical channels and downlink physical signals from the main radio base station. The information derived from the downlink physical channels and downlink physical signals is used by the auxiliary radio base station 904 to achieve TDD timing synchronization with the main radio base station. This way when the main radio base station is transmitting downlink physical channels and downlink physical signals, the auxiliary radio base station 904 also transmits the downlink physical channels and downlink physical signals at the same time. When the auxiliary radio base station 904 is receiving uplink physical channels and uplink physical signals, the main radio base station also receives the uplink physical channels and uplink physical signals at the same time. In some embodiments, the auxiliary radio base station can also locally generate uplink physical channels and uplink physical signals for transmission to the main radio base station.

Referring to FIG. 9A, the TDD timing obtained by the auxiliary base station is used to control the TDD switches 908 and 912. For example, when the main radio base station is transmitting the downlink physical channels and downlink physical signals, TDD Switch 908 is put in the receive mode while TDD switch 912 is put in the transmit mode. This way, downlink physical channels and downlink physical signals are transmitted to the communication devices via the auxiliary base station. When the main radio base station is receiving the uplink physical channels and uplink physical signals, TDD Switch 912 is put in the receive mode while TDD switch 908 is put in the transmit mode. This way, uplink physical channels and uplink physical signals transmitted by the communication devices are received at the main radio base station via the auxiliary base station.

Figure 9B:
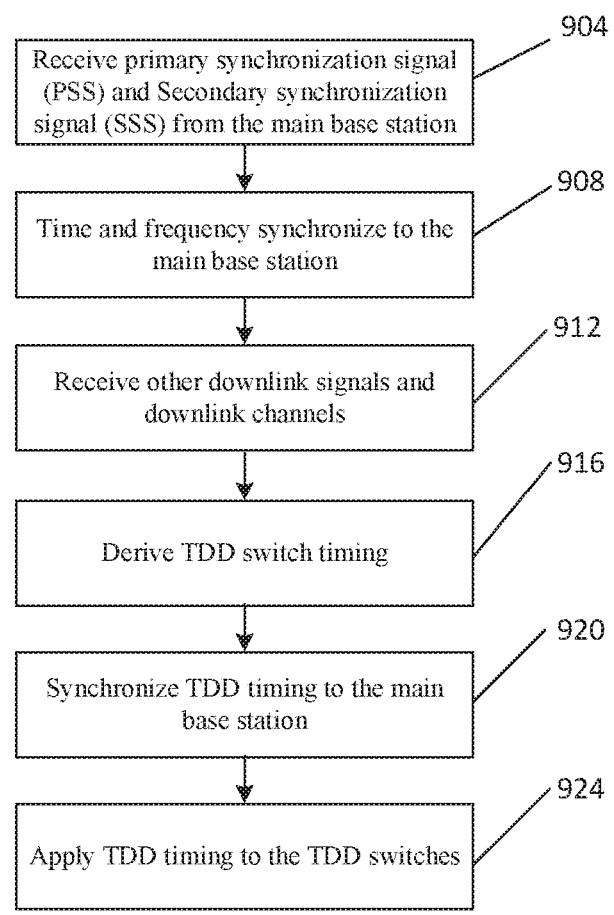

FIG. 9B is a flow diagram of a method of TDD timing synchronization according to disclosed embodiments. In a step 904, a primary synchronization signal (PSS) and a secondary synchronization signal (RSS) are received from the main base station. In a step 908, time and frequency are synchronized with the main base station using the received primary synchronization signal (PSS) and a secondary synchronization signal (RSS). In a step 912, downlink signals and downlink channels indicating TDD uplink and downlink periods are received. In a step 916, TDD downlink/uplink switch timing is derived based on the information received in the downlink signals and downlink channels. In a step 920, TDD downlink/uplink timing is synchronized with the main base station, and in step 924 TDD timing is applied to the TDD switches.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

The invention claimed is:

1. A method of wireless communication, comprising:
   receiving a plurality of first downlink signals at a first radio base station, wherein the plurality of first downlink signals each has a different frequency;
   down-converting the plurality of first downlink signals to a plurality of second downlink signals, wherein the plurality of second downlink signals having a same frequency;
   transmitting the plurality of second downlink signals to associated user equipments (UEs);
   receiving at the first radio base station a primary synchronization signal (PSS) and secondary synchronization signal (SSS) from the first downlink signals; and
   synchronizing a time division duplex (TDD) timing of the first radio base station with a TDD timing of a second radio base station using the PSS and SSS.

2. The method of claim 1, wherein the second downlink signals having the same frequency are transmitted in different directions to the associated UEs.

3. The method of claim 1, wherein the first downlink signals are transmitted from a second base station, and wherein the second base station is connected to the Internet.

4. The method of claim 3, wherein synchronizing the TDD timing comprises:
   setting a first switch at the first radio base station in a receive mode when the first radio base station is receiving downlink physical channels and downlink physical signals from the second radio base station; and
   setting a second switch at the first radio base station in a transmit mode when the first radio base station is transmitting the downlink physical channels and downlink physical signals to the associated UEs.

5. The method of claim 4, wherein the first and second switches are concurrently set to the receive and transmit modes, respectively.

6. The method of claim 1, wherein the first and second downlink signals have respective first and second bandwidths, and wherein the first bandwidth is larger than the second bandwidth.

7. The method of claim 1, wherein the first radio base station receives the first downlink signals having M channels and transmits the second downlink signals having N channels, where M>N.

8. The method of claim 1, wherein the first downlink signals have 52.6 GHz or higher frequency.

9. The method of claim 1, wherein the second downlink signals have a frequency range of 24.2 GHz-52.6 GHz.

10. The method of claim 1, further comprising:
    amplifying the received first downlink signals at the first radio base station;
    splitting the amplified first downlink signals into a plurality of first signal streams each having a different frequency;
    down-converting the first signal streams into a plurality of second signal streams having a same frequency;
    amplifying the plurality of second signal streams; and
    transmitting the amplified second signal streams to the associated UEs.

11. The method of claim 1, wherein the first base station comprises a plurality of sectors each configured to down-convert one of the first signal streams into a second signal stream and configured to amplify the second signal stream prior to transmission to one of the associated UEs.

12. A method of wireless communication, comprising:
    receiving a plurality of first uplink signals at a first radio base station, wherein the plurality of first uplink signals having a same frequency;
    up-converting the plurality of first uplink signals to a plurality of second uplink signals, wherein the plurality of second uplink signals each has a different frequency;
    transmitting the plurality of second uplink signals to a second base station;
    receiving at the first radio base station a primary synchronization signal (PSS) and a secondary synchronization signal (SSS); and
    synchronizing a time division duplex (TDD) timing of the first radio base station with a TDD timing of the second radio base station using the PSS and SSS.

13. The method of claim 12, wherein the first uplink signals are transmitted by associated user equipments (UEs).

14. The method of claim 12, wherein the second base station is connected to the Internet.

15. The method of claim 12, wherein synchronizing the TDD timing comprises:
    setting a first switch at the first radio base station in a transmit mode when the first radio base station is transmitting the second uplink signals to the second radio base station; and
    setting a second switch at the first radio base station in a receive mode when the first radio base station is receiving the first uplink signals from the associated UEs.

16. The method of claim 12, wherein the first and second uplink signals have respective first and second bandwidths, and wherein the first bandwidth is less than the second bandwidth.

17. The method of claim 12, wherein the first radio base station receives the first uplink signals having M channels and transmits the second uplink signals having N channels, where N>M.

18. The method of claim 12, wherein the first uplink signals are in 24.2 GHz-52.6 GHz frequency range.

19. The method of claim 12, wherein the first uplink signals are in sub-7 GHz frequency band.

20. The method of claim 12, wherein the second uplink signals have 52.6 GHz or higher frequency.

21. A radio base station, comprising:
    means for receiving a plurality of first downlink signals, wherein the plurality of first downlink signals each has a different frequency;

means for down-converting the plurality of first downlink signals to a plurality of second downlink signals, wherein the plurality of second downlink signals have a same frequency;
means for transmitting the plurality of second downlink signals to associated user equipments (UEs);
means for receiving at the first radio base station a primary synchronization signal (PSS) and a secondary synchronization signal (SSS) from the first downlink signals; and
means for synchronizing a time division duplex (TDD) timing of the first radio base station with a TDD timing of a second radio base station using the PSS and SSS.

22. The radio base station of claim 21, wherein the first downlink signals are transmitted by a second radio base station, wherein the second radio base station is connected to the Internet.

23. A radio base station, comprising:
means for receiving a plurality of first uplink signals at a first radio base station, wherein the plurality of first uplink signals have a same frequency;
means for up-converting the plurality of first uplink signals to a plurality of second uplink signals, wherein the plurality of second uplink signals has a different frequency;
means for transmitting the plurality of second uplink signals to a second base station;
means for receiving at the first base station a primary synchronization signal (PSS) and a secondary synchronization signal (SSS); and
means for synchronizing a time division duplex (TDD) timing of the first radio base station with TDD timing of the second radio base station using the PSS and SSS.

* * * * *